2,957,929

PRODUCTION OF ALPHA, OMEGA-DIISOPROPENYLALKANES

Harold E. De La Mare, El Cerrito, Calif., assignor to Shell Oil Company, New York, N.Y., a corporation of Delaware No Drawing. Filed June 23, 1958, Ser. No. 743,964

12 Claims. (Cl. 260—681)

This invention relates to the production of alpha, omega-diisopropenylalkanes of at least eight carbon atoms from corresponding di-tert. dihydric alcohols and relates more particularly to the production of 2,5-dimethyl-1,5-hexadiene.

The diisopropenylalkanes, such as, for example, 2,5-dimethyl-1,5-hexadiene, because of the positioning of the olefinic bonds and tertiary carbon atoms therein with respect to each other, provide a valuable potential source material for the production of important chemical derivatives therefrom. Utilization of these alpha,omega-di-tert. diolefins has heretofore been seriously handicapped because of the unavailability of a process enabling their efficient production of a large scale. Methods disclosed heretofore enabling the production of, for example, 2,5-dimethyl-1,5-hexadiene often involve the use of costly operative procedures. Reaction mixtures therein obtained generally contain but lesser amounts of the desired alpha, omega-diene thereby rendering the process impractical.

It is, therefore, an object of the present invention to provide an improved process enabling the more efficient production of diisopropenylalkanes having at least eight carbon atoms to the molecule. A particular object of the invention is the provision of an improved process enabling the more efficient production of 2,5-dimethyl-1,5-hexadiene with a minimum of operative procedure. A specific object of the invention is the provision of an improved process enabling the more efficient production of reaction mixtures predominating in 2,5-dimethyl-1,5-hexadiene from 2,5-dimethylhexane-2,5-diol. Other objects and advantages of the present invention will become apparent from the following detailed description thereof.

It is now well known that in the dehydration of alcohols, hydrogen is removed preferentially from the carbon atom adjacent to the carbinol carbon atom which is poorer in hydrogen in conformity with the rule first stated by Saytzeff. In dehydrating 2,5-dimethylhexane-2,5-diol by methods disclosed heretofore the reaction mixture obtained will generally predominate in 2,5-dimethyl-2,4-hexadiene, that is, the double bonds will assume preferentially an internal position in the unsaturated compound formed. The unsaturated compound thus generally expected to be obtained in predominant amount will therefore be a 1,3-diene, that is, a butadiene homologue rather than a 1,5-diene.

It has now been found that by the use of a well-defined specific combination of operating conditions the dehydration of 2,5-dimethylhexane-2,5-diol can be made to proceed in a manner in which the predominant reaction mechanism is contrary to that expected in accordance with the Saytzeff rule with the result that the reaction mixture obtained will now predominate in 2,5-dimethyl-1,5-hexadiene.

In accordance with the invention reaction mixtures consisting predominantly of alpha,omega-diisopropenyl-alkanes of at least eight carbon atoms are obtained by contacting a corresponding di-tert. dihydric alcohol in admixture with a lower aliphatic alcohol with a low-acidity aluminous material at a temperature of from about 250° to about 500° C.

The process of the invention is applied with particular advantage to the conversion of 2,5-dimethylhexane-2,5-diol to reaction mixtures consisting predominantly of 2,5-dimethyl-1,5-hexadiene. The invention is, however, applied broadly to the production of reaction mixtures consisting essentially of alpha,omega-diisopropenylalkanes by subjecting to the dehydration conditions of the present invention a di-tert. dihydric saturated aliphatic alcohol having at least eight carbon atoms to the molecule represented by the empirical formula:

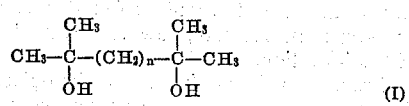

(I)

wherein $n$ is a whole number having a value of from 2 to 5, inclusive. The lowest member of the class of di-tert. dihydric alcohols represented by the foregoing Formula I is 2,5-dimethylhexane-2,5-diol.

Aluminous materials employed as catalysts in the process of the invention comprise aluminous materials of synthetic or natural origin having a relatively low acidity. Suitable aluminous materials comprise those having a hydrogen ion concentration in terms of pH values of above about 7, and preferably in the range of from about 7.5 to about 10, when suspended in water. Comprised in such suitable aluminous materials are the low-acidity adsorptive aluminas, bauxites, and, the like, of commerce. An example of a particularly suitable aluminous material is adsorptive alumina having a pore diameter of from about 15 to about 50 Angstrom units, a surface area of from about 50 to about 500 m.$^2$/g., and which is non-acidic to Hammett type of indicator. The aluminous materials may be used as such or in admixture with solid inert materials capable of functioning as diluents, temperature-controlling aids, or the like. The aluminous materials may be employed in the process of the invention in the form of a fixed stationary bed of particles, pieces or chunks thereof, or they may be employed in the form of a suspension, a fluidized bed, a dense phase bed, or similar conventional means of contacting solid materials with fluid reactants.

Essential to the attainment of the objects of the invention is the presence of a lower aliphatic, monohydric alcohol during the dehydration reaction. The use of methanol as the lower aliphatic alcohol is preferred. Other lower aliphatic alcohols, for example, the monohydric aliphatic saturated alcohols having from two to four carbon atoms to the molecule, although not necessarily the equivalent of methanol in effectiveness may, however, be used within the scope of the invention. The lower aliphatic alcohol may be introduced in part, or in entirety, as a separate stream into the reaction zone or may be combined with the di-tert. dihydric diol reactant before entering the reaction zone. In a preferred method of carrying out the process of the invention the di-tert. dihydric alcohol reactant is admixed with the monohydric alcohol solvent before introduction into the reaction zone.

The amount of the auxiliary monohydric alcohol employed may vary considerably within the scope of the invention. In general the use of the auxiliary alcohol, such as methanol, in an amount ranging, for example, from about 25% to about 500%, and preferably from about 80% to about 200% by volume of the di-tert. dihydric alcohol reactant is satisfactory. Higher or lower amounts of the auxiliary alcohol may, however, be employed within the scope of the invention. The auxiliary alcohol employed may suitably consist of a mixture of two or more of the suitable monohydric alcohols.

Dehydration of the di-tert. dihydric diol is executed at a temperature in the range of, for example, from about 250° to about 500° C., preferably in the range of from about 300° to about 400° C. The specific temperature preferably employed will depend somewhat upon the other operating conditions, the specific organic charge, and specific aluminous catalyst material employed. A part or all of the organic reactants, as well as a part or all of the monohydric alcohol employed, is preferably preheated before introduction into the reaction zone. A part or all of such preheated material may be injected into the reaction zone at a plurality of points along the length thereof.

The dehydration may be carried out at subatmospheric, atmospheric or at slightly superatmospheric pressures. Pressures in the range of, for example, from about 0.1 atm. to about 5 atm. will be found satisfactory. Higher or lower pressures may, however, be used within the scope of the invention.

Essential to the attainment of the objects of the invention is the execution of the process with a short contact time. The time of contact of organic reactant with the aluminous material may suitably be maintained in the range of from about 0.1 to about 20 seconds. The contact time is preferably maintained below about 10 seconds and still more preferably below about 5 seconds. The minimum contact time permissible within the scope of the invention will vary according to the specific organic charge and specific aluminous catalyst material employed, and the degree of conversion desired. A contact time of as short as about 1 second will often be found satisfactory in the dehydration of 2,5-dimethylhexane-2,5-diol in the presence of methanol in the temperature range of from about 325° to about 375° C.

Under the above-defined conditions, dehydration with abnormal abstraction of hydrogen from the di-tert. dihydric alcohol charge, will be the predominant reaction mechanism with the formation of a reaction product having double bonds external to each of the two tert. carbinol groups. Thus, di-tert. dihydric alcohols of the foregoing Formula I will be converted to alpha,omega-diisopropenylalkanes represented by the general formula:

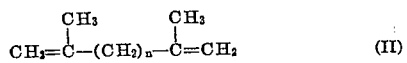

wherein $n$ is a whole number having a value of 2 to 5, inclusive. Thus in the process of the invention 2,5-dimethylhexane-2,5-diol is converted to a reaction mixture consisting predominantly of 2,5-dimethyl-1,5-hexadiene (bimethallyl), that is, the lowest member of the class of alpha,omega-tert. diolefins defined by the foregoing Formula II.

The process of the invention thus provides a process enabling the efficient conversion of the di-tert. dihydric alcohols defined by the foregoing Formula I to correspond alpha,omega-diisopropenylalkanes in a single-step operation; thereby bringing within the realm of practicability the large-scale production of these valuable alpha, omega-di-ter. diolefins.

The following examples are illustrative of the process of this invention:

*Example I*

A mixture of equal parts by volume of 2,5-dimethylhexane-2,5-diol and methanol was passed through a bed of alumina of low acidity, (Alcoa, F–1, 8–14 mesh) maintained at a temperature of 330°–360° C., and atmospheric pressure, with a contact time of about 5 seconds. After removal of methanol, analysis of the resulting reaction mixture indicated the production of 2,5-dimethyl-1,5-hexadiene (bimethallyl) with a yield of 65–70%.

*Example II*

2,5-dimethyl-3-hexyne-2,5-diol, dissolved in isopropyl alcohol, was hydrogented over a nickel catalyst to 2,5-dimethylhexane-2,5-diol. The 2,5-dimethylhexane-2,5-diol so produced was mixed with methanol in a volume ratio of methanol to 2,5-dimethylhexane-2,5-diol of 1:1. The resulting mixture was passed in vapor phase through a bed of alumina (Alcoa, F–1, 8–14 mesh, pH above 7 in water) at a temperature of 350° C. and atmospheric pressure with a contact time of 5 seconds. Fractionation and analysis by infrared spectroscopy and gas chromatography of the reaction mixture obtained indicated it to have the following composition:

| | Percent by weight |
|---|---|
| 2,5-dimethyl-1,5-hexadiene, B.P. 115° C. at 750 mm. Hg, $n_D^{20}$ 1.4303 | 64 |
| 2,5-dimethyl-1,4-hexadiene | 6 |
| 2,5-dimethyl-2,4-hexadiene, B.P 135° C. at 750 mm. Hg, $n_D^{20}$ 1.477 | 26 |
| By-products | 4 |

A yield of 2,5-dimethylhexadienes of over 91%, based upon the 2,5-dimethyl-3-hexyne-2,5-diol, was obtained.

*Example III*

In a continuous operation 40.8 mols 2,5-dimethylhexane-2,5-diol in admixture with an amount of methanol resulting in a mixture containing 39% of the diol and 61% of methanol, by weight, was passed through a bed of alumina which was non-acidic to Hammett type of indicator (208 m.$^2$/g. surface area, pore diameter 15 to 20 Angstroms), at a temperature of about 340° C. with a contact time of 1 second and at atmospheric pressure. The reactor effluence was cooled, methanol removed therefrom by washing with water, and then subjected to fractionation. A 96% yield of crude dimethylhexadiene was obtained, 75% of which was shown by distillation to consist of 2,5-dimethyl-1,5-hexadiene.

The invention claimed is:

1. The process for the production of reaction mixtures consisting predominantly of alpha,omega-diisopropenylalkanes which comprises contacting a di-tert. dihydric alcohol of the general formula:

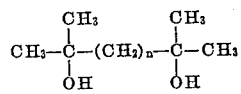

wherein $n$ represents a whole number having a value of from 2 to 5 inclusive, in admixture with a lower aliphatic saturated alcohol having from one to four carbon atoms to the molecule, with a low-acidity aluminous material selected from the group consisting of low-acidity alumina and bauxite at a temperature of from about 250° to about 500° C.

2. The process in accordance with claim 1 wherein said di-tert. dihydric alcohol is 2,5-dimethylhexane-2,5-diol.

3. The process in accordance with claim 1 wherein said low-acidity aluminous material is an adsorptive low-acidity alumina having a pH above about 7 in water.

4. The process in accordance with claim 3 wherein said lower aliphatic alcohol is methanol.

5. The process in accordance with claim 3 wherein said temperature is in the range of from about 300° to about 400° C.

6. The process for the production of a reaction mixture consisting predominantly of 2,5-dimethyl-1,5-hexadiene which comprises contacting 2,5-dimethylhexane-2,5-diol, in admixture with a lower aliphatic monohydric saturated alcohol having from one to four carbon atoms to the molecule, with a low-acidity aluminous material selected from the group consisting of low-acidity alumina and bauxite, at a temperature of from about 300° to about 400° C., and a contact time of from about 0.1 to about 20 seconds.

7. The process in accordance with claim 6 wherein said aluminous material is a low-acidity alumina having a pH of from about 7.5 to about 10 when measured in water.

8. The process in accordance with claim 7 wherein said lower aliphatic alcohol is methanol.

9. The process in accordance with claim 8 wherein said temperature is in the range of from about 325° to about 375° C.

10. The process for the production of reaction mixtures consisting predominantly of 2,5-dimethyl-1,5-hexadiene which comprises, contacting 2,5-dimethylhexane-2,5-diol, in admixture with methanol, with low-acidity alumina, at a temperature of from about 300° to about 400° C., and a contact time of from about 0.1 to about 20 seconds.

11. The process in accordance with claim 10 wherein said temperature is in the range of from about 325° to about 375° C.

12. The process in accordance with claim 11 wherein said alumina has a pH of from about 7.5 to about 10 when determined in water.

References Cited in the file of this patent

UNITED STATES PATENTS

| | | |
|---|---|---|
| 1,682,919 | Maximoff | Sept. 4, 1928 |
| 1,944,153 | Muller-Cunradi | Jan. 23, 1934 |
| 2,204,157 | Semon | June 11, 1940 |
| 2,389,205 | Marsh | Nov. 20, 1945 |
| 2,419,030 | Otto et al. | Apr. 15, 1947 |
| 2,502,431 | Copenhaver et al. | Apr. 4, 1950 |
| 2,715,649 | Hammond | Aug. 16, 1955 |